United States Patent
Nemish

(10) Patent No.: US 8,739,625 B2
(45) Date of Patent: Jun. 3, 2014

(54) MANUAL CLAMPING DEVICE FOR STATIC BALANCING A WHEEL

(76) Inventor: Stephen C. Nemish, Valley Park, MO (US)

( * ) Notice: Subject to any disclaimer, the term of this patent is extended or adjusted under 35 U.S.C. 154(b) by 1994 days.

(21) Appl. No.: 11/621,891

(22) Filed: Jan. 10, 2007

(65) Prior Publication Data

US 2008/0163959 A1    Jul. 10, 2008

(51) Int. Cl.
   *G01M 1/04*    (2006.01)
   *G01M 1/12*    (2006.01)

(52) U.S. Cl.
   USPC .............................................. 73/487; 73/480

(58) Field of Classification Search
   USPC ............ 73/487, 460, 462, 468, 480, 481, 478
   See application file for complete search history.

(56) References Cited

U.S. PATENT DOCUMENTS

| | | | | |
|---|---|---|---|---|
| 1,881,205 A * | 10/1932 | Lundgren | ................... | 235/61 A |
| 2,752,788 A * | 7/1956 | La Penta | ......................... | 73/487 |
| 3,201,997 A * | 8/1965 | Rosenblum | .................... | 73/480 |
| 3,236,105 A * | 2/1966 | Hamer | ............................. | 73/481 |
| 3,820,403 A * | 6/1974 | Thompson | ..................... | 73/480 |
| 4,302,975 A * | 12/1981 | Sugiyama et al. | .............. | 73/460 |
| 4,489,608 A * | 12/1984 | Borner | ............................ | 73/487 |
| 5,656,775 A * | 8/1997 | Kawabe | .......................... | 73/487 |
| 6,854,194 B2 * | 2/2005 | Hansen | ........................... | 33/520 |

\* cited by examiner

*Primary Examiner* — Helen Kwok
(74) *Attorney, Agent, or Firm* — Charles McCloskey

(57) ABSTRACT

A manual device, for use in a stand, provides a threaded rod with two opposed cones coaxial upon the rod. The cones have wider bases located outwardly from the center of the rod and narrow tops located inwardly. Threaded holes centered in the tops of the cones admit the rod. In use, a wheel is placed upon the rod and the cones are turned towards the wheel, points toward the wheel. As the cones engage the wheel, the angled surface of each cone guides the wheel to be centered upon the rod. For open hubs, one cone is reversed so the base contacts the wheel while the top of the other enters the wheel hub and the base. When finger tight, the cones secure the wheel to the rod without marring for spinning and balancing on an axis coaxial with the rod.

8 Claims, 4 Drawing Sheets

MANUAL CLAMPING DEVICE FOR STATIC BALANCING A WHEEL

BACKGROUND OF THE INVENTION

The manual clamping device for static balancing a wheel generally relates to hand operated tire changing machinery and more specifically to a rod with coaxial cones that centers and secures a wheel upon the rod during balancing of a wheel.

In bays and shops around the world, numerous tires are changed from wheels every day. During a tire change, a worn or damaged tire is removed from a wheel and a new tire is installed. Following a tire change, a wheel is balanced by spinning it upon its axis through the center. By a balancing machine or visual or auditory means, a mechanic determines where the wheel is out of balance and so marks the tire of the wheel with chalk or other marker. The mechanic then places weights upon the wheel at the marks and spins the weighted wheel to check for balance shown by the absence of vibration. The weighting and checking is repeated until the wheel balances.

Some bays and shops use manual equipment for balancing of wheels, particularly static balancing. Manual balancing involves a stand that supports a rod upon which a wheel turns. The stand is vertical and maintains the rod generally horizontal so a wheel rotates within a vertical plane. In the vertical plane, the wheel balancing occupies a minimum of floor space, useful to small and crowded shops. As the wheel turns, a mechanic notes, with chalk or other marker, points on the wheel that are out of balance. The mechanic then attaches weights upon the marked places of a rim. The mechanic then spins the wheel to check its balance, when the wheel stops at any point of rotation, it has achieved a static balance. If necessary, the weighting and checking is repeated until the wheel achieves a balanced state.

Wheels are used on many vehicles. On utility vehicles, the appearance of wheels matters less so than on personal vehicles. For automobiles, motorcycles, and some boat trailers, the wheels and their appearance have high importance to their drivers. People often place great emphasis on the appearance of wheels as part of their self image. The after market in wheels of all kinds has enormous size. Often, people seek out shiny, or novelty, wheels to customize vehicles. In particular, motorcycles have shiny wheels including spokes and rims. The shine upon the wheels arises from metal alloy, or metal plating, upon the wheel, particularly the rim. Alloys and plating are readily damaged by harder materials usually contained in shop tools and equipment that shop tools and equipment are known to mar wheels. The owners of shiny wheels have little tolerance for shop caused blemishes upon their wheels.

DESCRIPTION OF THE PRIOR ART

Traditionally, wheels, even shiny wheels, have been clamped for tire balancing and other procedures. Metal clamps grip the hub of a wheel snugly upon an axle that is then rotated to find the light point of a wheel. Across the diameter from the light point is the theoretical heavy point of a wheel. A properly sized weight placed at the light point offsets the heavy point so the wheel becomes balanced. The metal clamps are generally made of steel or other alloy. The hardness of the steel clamps allows the clamps to mar hubs of softer material, such as aluminum and its alloys.

In existing static wheel balancers, two clamps, or narrow cones are advanced upon a smooth rod into the hub of a wheel. The existing cones secure hubs up to an inch in diameter. For hubs larger than one inch, or those wheels open beyond the axle location, separate specialized cones are required. The specialized cones are a solid shape of steel and engage the hub over an inch in diameter and the hub proximate to an axle in an open wheel. However, for open wheels, the specialized cones must be tightly engaged upon the hub to prevent rotation of the wheel. A loose specialized cone permits an open wheel to rotate and a tight specialized cone may mar or damage any abutting spokes.

The present invention overcomes the difficulties of marring a wheel during static balancing of large or open hubs.

SUMMARY OF THE INVENTION

Generally, the present invention provides a threaded rod with two opposed hollow wide cones coaxial with the rod. The cones have their wider bases located outwardly from the center of the rod and their narrow tops located inwardly. The cones have a threaded hole, centered in their tops, through which the rod passes. In use, a wheel is placed upon the rod and the cones are turned towards the wheel, tops or points toward the wheel. As the cones engage the wheel, the angled surface of each cone guides the wheel to be centered upon the rod. For open hubs, one cone is reversed so the base contacts the wheel while the top of the other cone contacts the wheel from the other side. When finger tight, the cones secure the wheel to the rod and allow the wheel to spin on an axis coaxial with the rod.

There has thus been outlined, rather broadly, the more important features of the invention in order that the detailed description thereof that follows may be better understood and that the present contribution to the art may be better appreciated. The present invention also includes cones with a flat edge for manual gripping and a certain angle. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved manual clamping device.

Another object is to provide such a manual clamping device that operates without marring the surface of a wheel.

Another object is to provide such a manual clamping device that operates upon uneven support surfaces yet still indicates a heavy point upon a wheel.

Another object is to provide such a manual clamping device that has dished, or hollow, cones that permit nesting of adjacent cones.

Another object is to provide such a manual clamping device that grasps both open hubs and large hubs.

Another object is to provide such a manual clamping device that accommodates offsets in hubs, such as those for a Corvette® or BMW® motorcycle.

Another object is to provide such a manual clamping device that permits adjustment of its balancing cones along the axis of wheel rotation.

Another object is to provide such a manual clamping device that also aids in truing a wheel.

Another object is to provide such a manual clamping device that operates using one cone for easier changing of wheels during high demand balancing periods.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
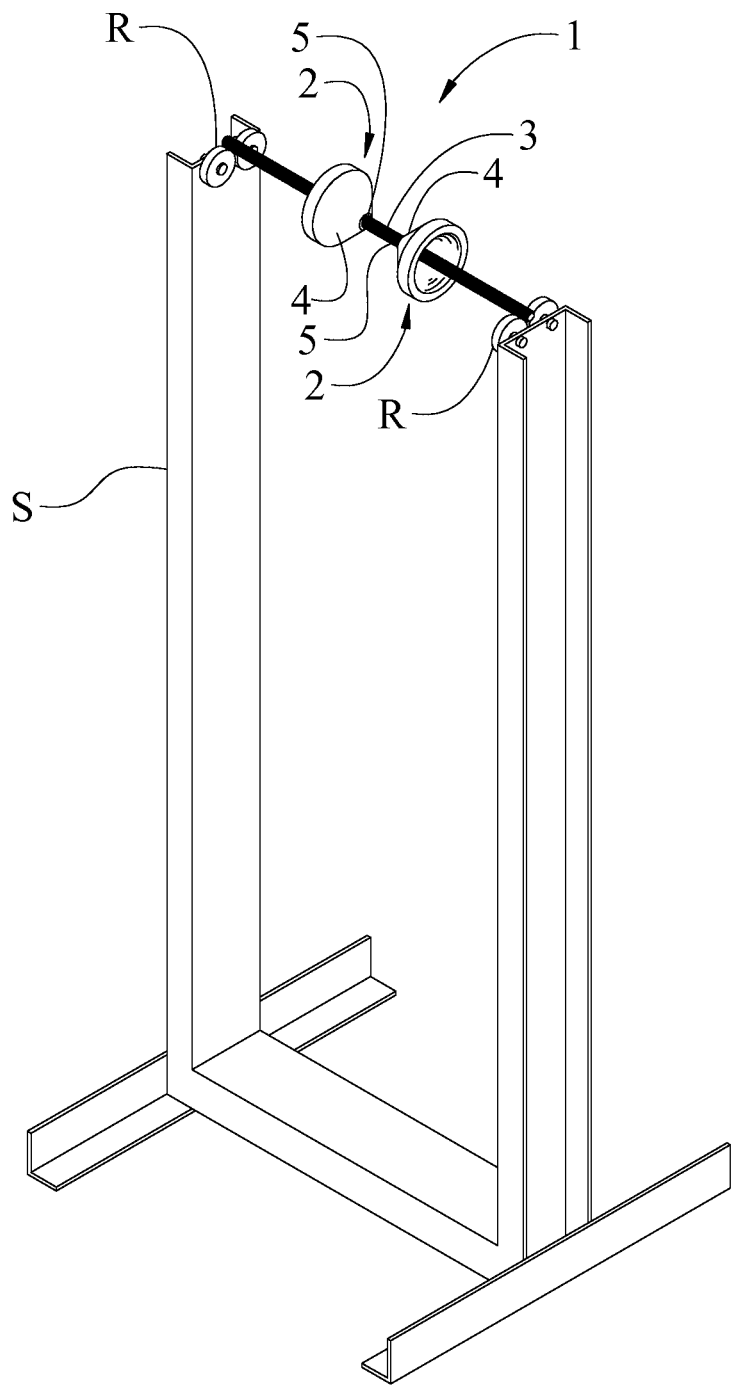
FIG. 1 shows an isometric view of the present invention upon a stand.

The present art overcomes the prior art limitations by providing a tool 1, with two cones 2 that secures a wheel upon a rod 3 for balancing without marring the wheel and hub. Beginning on FIG. 1, the present invention is shown mounted upon an existing two support stand S. Each support has round rollers R for ready turning of rods placed thereupon. The present invention has a threaded rod 3 resting upon the supports of the stand. Upon the threaded rod, two cones 2 are threadily engaged and upon rotation, advanced towards the center of the rod to grasp a hub of a wheel placed upon the rod. Each cone has a surface 4, generally at an angle to the rod. This figure shows the preferred position of the cones with the narrow apex 5 of both cones towards the center of the rod. In this position, the surfaces of both cones grip the perimeter of the hole in a wheel, or hub, for a secure fit upon the rod. The threaded connection of the cones to the rod prevents slippage of the wheel relative to the rod and allows a substantial clamping force to be applied to a wheel without the use of hand tools. The cones do not deflect, widen, or spread when abutting a wheel with a heavy, or large offset. The threaded connection secures a wheel using the friction between the cones and the rod alone. This threaded connection is unlike the set screws used to secure cones to smooth rods in prior art balancers. Those set screws require a separate tool to secure them upon a smooth rod and in time the set screws scratch and dent the smooth rod which alters its usage and lessens its ability to balance wheels placed upon it.

Figure 2:
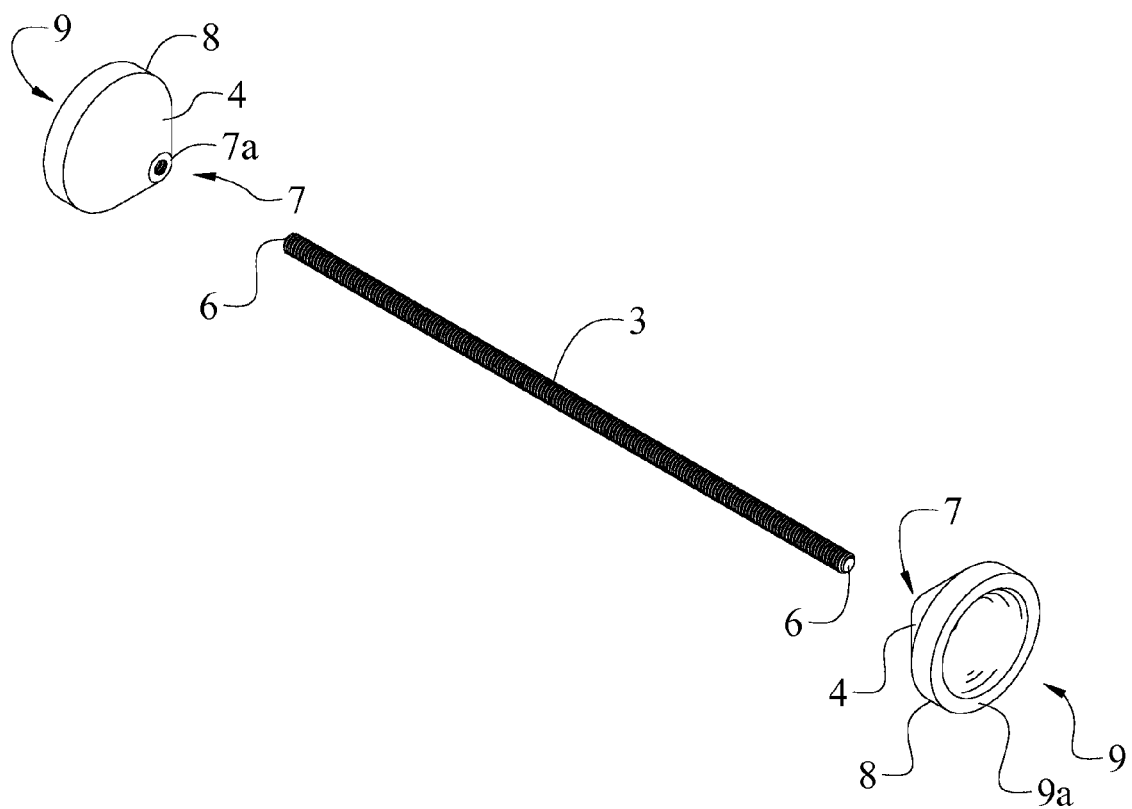
FIG. 2 shows an exploded view of the present invention.

The present invention is shown in more detail in FIG. 2 where the cones are shown separate from the rod. The rod 3 is generally cylindrical and elongated with external right hand threads upon its surface and extending longitudinally. The rod has two opposed ends 6. In the preferred embodiment, the threads extend upon the entire length of the rod. Alternatively, the threads extend partially along the length of the rod, generally in the center. Alternatively, the rod has right hand threads upon one end and left hand threads upon the opposite end.

In the preferred embodiment, the cones are identical and shown symmetrical so one cone will be described. Here, a cone has a top, or point 7, of its narrowest width. The point is truncated and has a flat face 7a generally oriented perpendicular to the threaded rod. The point has an internally threaded hole 7b therethrough to receive the threaded rod. From the point, the cone expands outward in width and away from the center of the point. The cone reaches its maximum width at the rim 8. The rim is the generally round circumference of the cone opposite the point and is generally parallel to the threaded rod. The height of the rim is proportional to the thickness of the cone. The rim also forms the base, or cup 9, of the cone. The cup has a flat perimeter face 9a generally parallel to the face of the point. Between the point and the cup, the cone has a surface 4, generally at an acute angle to the longitudinal axis of the threaded rod.

In the preferred embodiment, the hole at the point receives an approximately ⅜ inch diameter rod while the point fits into at least a ⅞ inch diameter hub and the surface expands to an approximate three and ⅜ inches at the rim. The preferred embodiment has sizing to accommodate wheels from BMW branded motorcycles. The surface is generally at a forty five degree angle to the threaded rod. In an alternate embodiment, the dimensions of the point and the cup are adjusted to accommodate the size of hub in the wheel. Though motorcycle wheels are described, other larger and smaller wheels may use this invention at a different scale.

Figure 3:
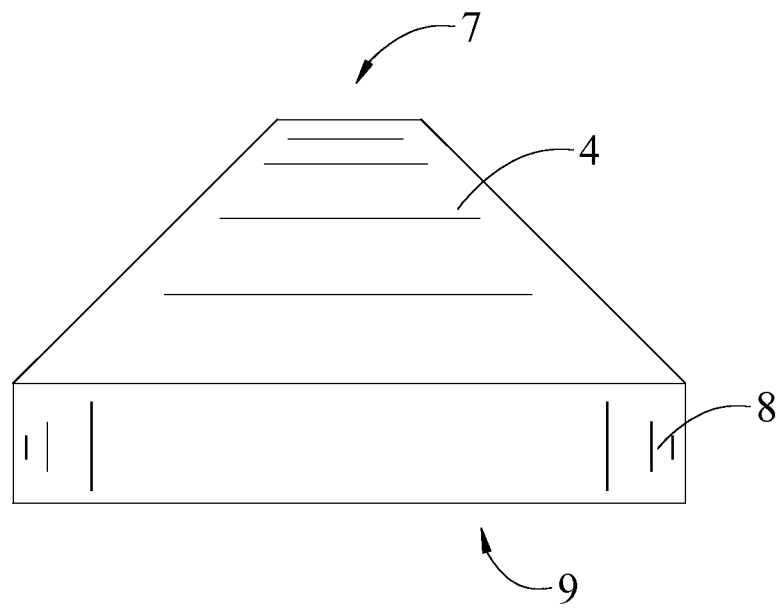
FIG. 3 describes a side view of a cone of the present invention.
Figure 4:
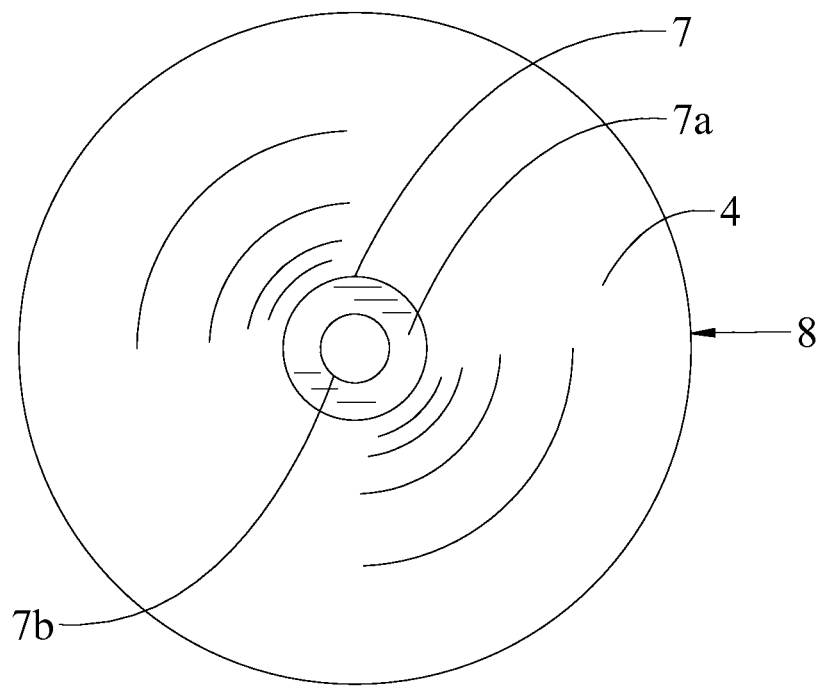
FIG. 4 illustrates a top view of a cone.

A cone of the present invention is shown from the side in FIG. 3. Each cone has a top, or point, generally a flat, or horizontal face short of the intended apex of the conic shape. The point has a threaded opening to receive the rod (not shown). From the point, the cone flares outwardly, approximately at a forty five degree angle towards the rim. The outside angle of the surface generally matches the inside angle of the cup as shown in FIG. 4. The rim extends away from the point and has a width proportional to the thickness of the surface. Where the rim ends away from the point, the rim becomes the cup later shown in FIG. 5.

Figure 5:
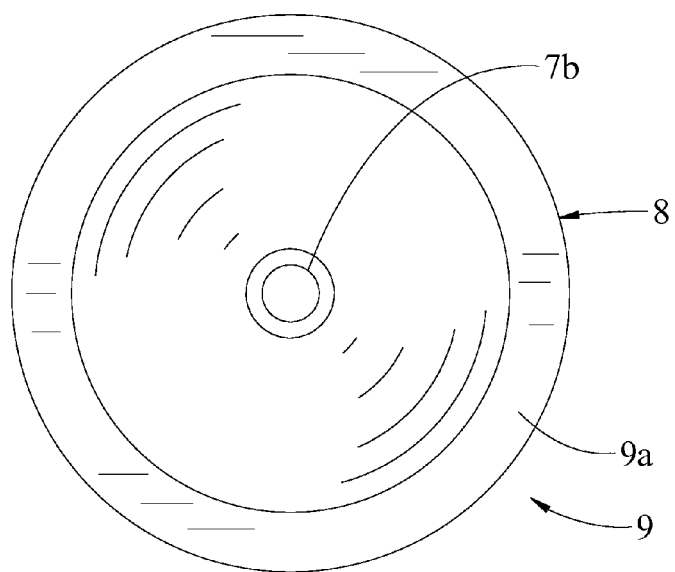
FIG. 5 shows a bottom view of a cone.

The top view of the cone shows the point in FIG. 5. The point has a flat face generally proportional to the thickness of the surface. The surface expands outwardly from the to the rim as previously described. Generally the rim is round as shown here. The round surface permits continuous engagement of the surface with the hub of a wheel while the round rim allows a mechanic to grip the cone for turning by hand.

Figure 6:
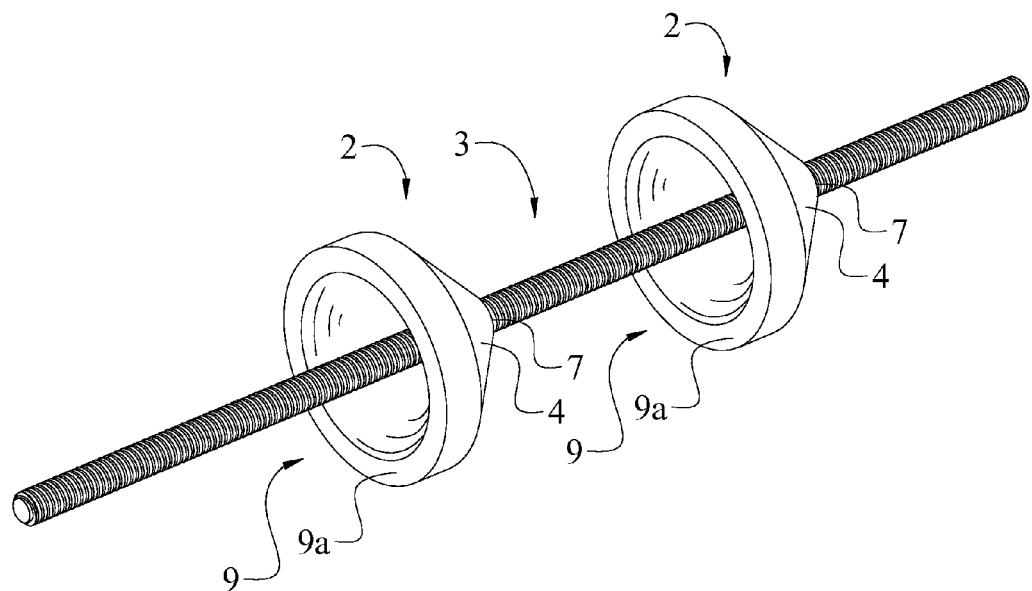
FIG. 6 illustrates an isometric view of the present invention with the cones having the same orientation.

FIG. 6 shows the cone from the bottom, or cup. The cone has the threaded aperture at the point and the surface expands outwardly, here at an inside angle. The inside angle is generally the same as the outside angle of the surface, forty five degrees. The inside angle denotes that the cup is recessed inwardly towards the point. Away from the point, the cup expands to its perimeter at the rim. The rim has a flat face here similar to a base. The flat face is generally perpendicular to the axis through the threaded hole of the point. The width of the rim is proportional to the thickness of the surface.

Where FIG. 1 showed the typical assembly of the invention, point to point, FIG. 6 shows an alternate assembly of the invention, here point 7 to cup 9. Both cones are threaded upon the rod with the rod through the threaded hole at the point and the cup towards an end of the rod. In this position, the point 7 of one cone passes into the recessed cup 9 of a second cone 2.

This position of cones allows the present invention to grip a wheel with a large hole for the hub or one with a thin hub, such as seen in motorcycle wheels. The base of the second cone abuts the hub with the large hole while the point of the first cone advances into the hole and the surface grabs the perimeter of the large hole for a secure fit of the wheel within the two cones. As before, the threaded connection of the cones to the rod prevents slippages and allows a substantial clamping force to be applied to a wheel without the use of hand tools.

From the aforementioned description, a manual clamping device for static balancing a wheel has been described. The manual clamping device y is uniquely capable of securing wheels for balancing without marring them and without separate hand tools. The cones are preferably made from polyethylene or nylon to prevent marring of wheels and the threaded rod has external threads that mate with internal threads within the cone to minimize abrasion of the cones. The manual clamping device and its various components may be manufactured from many materials, including but not limited to, polymers, polyvinyl chloride, high density polyethylene, polypropylene, nylon, steel, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device for balancing a tire upon a wheel, said device locating upon a stand, said wheel having a hub generally centered therein and rotating about an axis generally parallel to a horizon, without marring said wheel and without the use of hand tools, comprising:
   an elongated threaded rod, said rod adapting to exceed the length of said stand; and,
   two conically shaped members advancing upon said rod, having lesser hardness than said hub, being of a material to prevent marring, and securing said hub and said wheel between said members.

2. The tire balancing device of claim 1 further comprising:
   each of said members having an apex with a threaded hole cooperating with said rod, a surface flaring outwardly from said apex, a rim locating outwardly from said apex at the maximum diameter of said surface and being parallel to a longitudinal axis of said rod, and a base opposite said apex and outwardly from said rim, said rim and said surface being hollow.

3. The tire balancing device of claim 2 further comprising:
   said apex being truncated, forming a flat surface generally perpendicular to said rod; and,
   said flaring surface having an outside angle from said apex to said rim, and an inside angle from said rim upon an interior of said flaring surface to said apex.

4. The tire balancing device of claim 3 wherein said inside angle and said outside angle are forty five degrees.

5. The tire balancing device of claim 4 wherein said apex has an approximately seven eighths of an inch outside diameter and said rim has an approximately three and three eighths of an inch outside diameter.

6. The tire balancing device of claim 2 further comprising:
   both of said members having each of said apexes locating towards the center of said rod.

7. The tire balancing device of claim 2 further comprising:
   one of said members having said apex locating towards the center of said rod, and the other of said members having said base locating towards the center of said rod.

8. A device for balancing a tire upon a wheel, said device locating upon a stand, said wheel having a hub generally centered therein and rotating about an axis generally parallel to a horizon, without marring said wheel and without the use of hand tools, comprising:
   an elongated threaded rod, said rod adapting to exceed the length of said stand;
   two conically shaped members advancing upon said rod, having lesser hardness than said hub, being of a material to prevent marring, and securing said hub and said wheel between said members;
   each of said members having an apex with a threaded hole cooperating with said rod, a surface flaring outwardly from said apex, a rim locating outwardly from said apex at the maximum diameter of said surface and being parallel to a longitudinal axis of said rod, and a base opposite said apex and outwardly from said rim, said rim and said surface being hollow, said apex being truncated, forming a flat surface generally perpendicular to said rod, said flaring surface having an outside angle from said apex to said rim, an inside angle from said rim upon an interior of said flaring surface to said apex, said inside angle and said outside angle are forty five degrees, and said apex has an approximately seven eighths of an inch outside diameter and said rim has an approximately three and three eighths of an inch outside diameter.

* * * * *